Feb. 3, 1942.  B. H. WILDMAN  2,272,102
ILLUMINATION SYSTEM AND METHOD FOR PHOTOGRAPHY
Filed Aug. 12, 1939  2 Sheets-Sheet 1

Inventor
Benjamin H. Wildman
By Charles L. Reynolds
Attorney

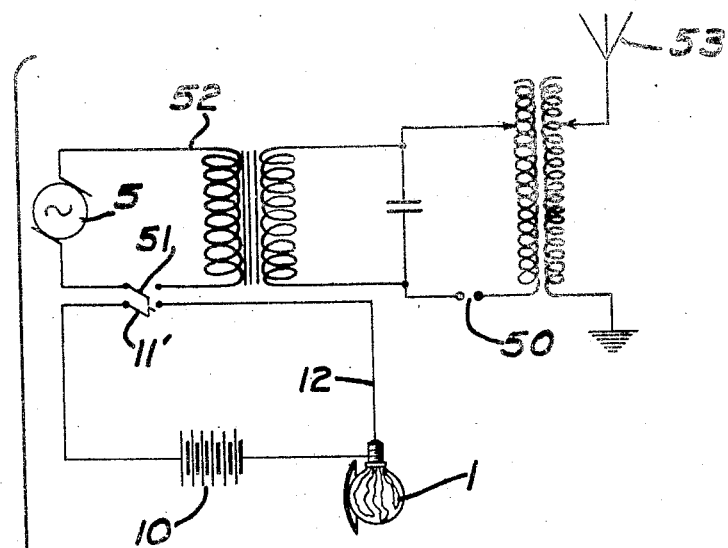
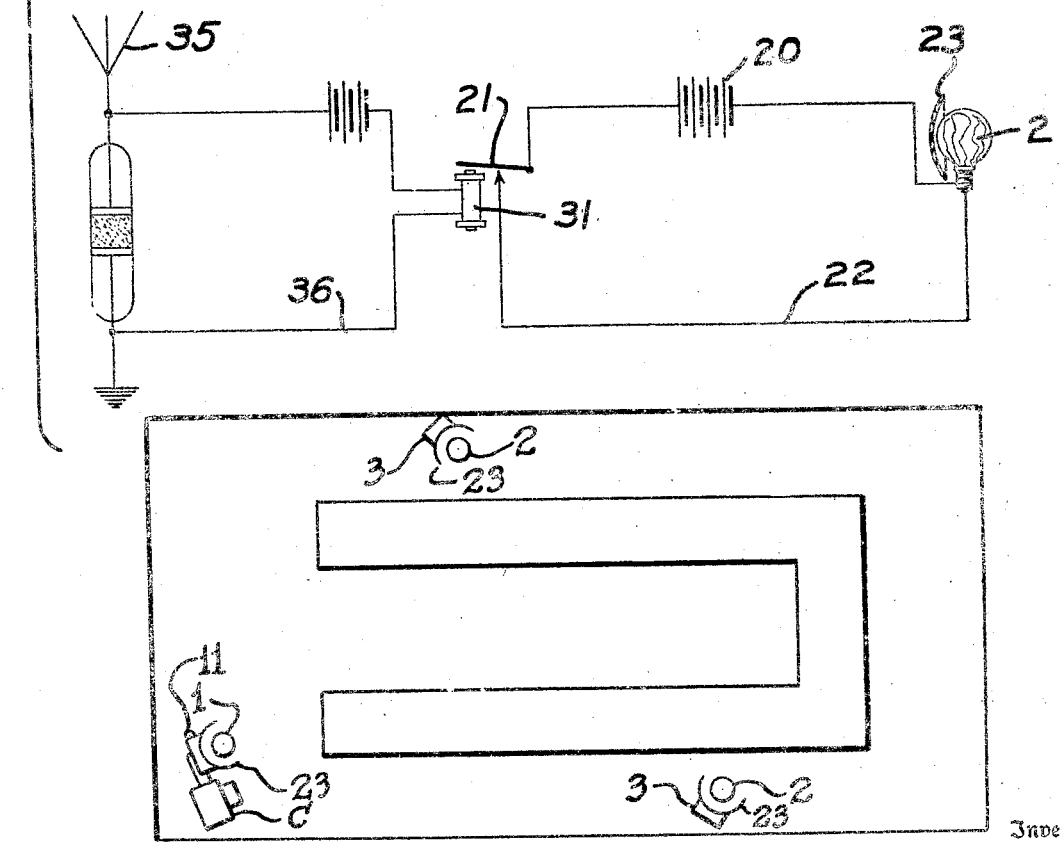
Fig. 3
Fig 4
Inventor
Benjamin H. Wildman
By Charles L. Reynolds
Attorney Patented Feb. 3, 1942

2,272,102

UNITED STATES PATENT OFFICE 2,272,102

ILLUMINATION SYSTEM AND METHOD FOR PHOTOGRAPHY

Benjamin H. Wildman, Seattle, Wash.

Application August 12, 1939, Serial No. 289,811

14 Claims. (Cl. 67—31)

Photographs of large groups, for instance, of conventions and like gatherings in an auditorium, are generally flat and lack perspective, depth, and detail, largely because of lack of illumination which is distributed with sufficient uniformity and intensity throughout the entire scene. Flood lamps do not afford sufficiently intense illumination to give an action photograph, and are objectionable and disturbing to the audience, hence such photographs are usually taken by the use of a flash-bulb, located behind the lens or in its vicinity. Obviously such a flash-bulb can only illuminate nearby persons or objects with sufficient intensity (frequently, for those nearest, with more than sufficient intensity), and those more distant are not clearly recorded on the exposed plate. The scene is not nearly so well photographed as if other light sources of comparable intensity (or perhaps each one of somewhat lesser intensity than when a single flash-bulb is used) were distributed about the scene, to illuminate all parts of it with more or less uniform intensity.

Attempts have been made to obtain the required light distribution by distributing flash-bulbs around at strategic points, where, when energized and flashed simultaneously through common electrical connections to a master switch, they will illuminate the entire scene. This system introduces a further difficulty in that there must be a network of wires, extended from the one point, usually adjacent the camera, to the several individual flash-bulbs arranged at distant points about the building. Not only is there the physical difficulty of laying and retrieving such lines, laid often through milling throngs of persons, but there is the very real further difficulty that persons in the audience will often accidentally or mischievously disconnect or break certain electric lines, with the result that expected sources of illumination are not energized, and the lighting of the picture becomes spotted, and the photograph is still imperfect.

Faced with such practical difficulties, I have devised the system which will be explained hereafter, and the method to be disclosed, as a means of enabling the photographing of such scenes with the minimum of difficulty, with the minimum of likelihood of failure to function due to accidental or human causes, and in a manner which will afford the desired depth, perspective, and evenness of illumination, and yet by means which are, in themselves and in their cooperative relations, simple, comparatively inexpensive, and readily obtainable.

Since such scenes are not infrequently illuminated, for the convenience of the audience, by daylight or by ordinary lighting fixtures which gives light but little less intense than is required during the exposure of the plate, and since my invention in one form employs photo-sensitive trigger means to set off the individual flash-bulbs, it is a further object to provide means to control the light which may affect each such photo-sensitive device, in such manner that it will only operate in response to extraordinarily intense illumination, and not to the normal illumination, however brilliant it may be.

With these and other objects in mind, as will appear hereafter, my invention comprises the novel method and the novel system, as shown in the accompanying drawings, described in this specification, and as will be more particularly defined in the claims which terminate this specification.

It will be understood, of course, that many changes may be made in the form, character, and arrangement of the parts of the system, but the accompanying drawings show, diagrammatically, a preferred arrangement of the system and various preferred forms of the elements for incorporation in such a system.

Figure 3 is a diagram of a master unit and of a slave unit, illustrating a further modified form of the elements.

Figure 4 is a diagrammatic plan view showing a typical disposition of master and slave units about a scene to be photographed.

It is, of course, essential that various light sources be distributed throughout the scene, or arranged in such a manner that each one will illuminate more particularly its own portion of the scene, and since flash-bulbs are generally employed for such purposes these have heretofore been distributed around, but have had to be connected each by wiring to a master switch or key, and it is the wiring connections that offer the greatest difficulty under such circumstances as have been indicated above. Yet it has seemed essential to employ the wiring connections, since there appeared no other way of synchronizing the energization and flashing of the bulbs. Such synchronization had to be substantially perfect, for while the shutter might be opened a short period of time, this period was relatively short—for instance in the neighborhood of one-fifth of a second. Otherwise persons moving about in the crowd would cause the picture to be streaked and blurred from their movement. In consequence it is necessary that all the flashes occur at substantially the same instant. I have discovered, however, how such synchronization of flashes may be achieved without the employment of wiring or any physical or electrical connection between the master unit and any of the slave units. The essence of the invention resides in a system and in a method wherein there is no tangible connection between the master unit and one or more slave units, usually distantly placed, and which is or are to be energized at the same instant as the master unit or some other slave unit controlled by the master unit.

Figure 1:
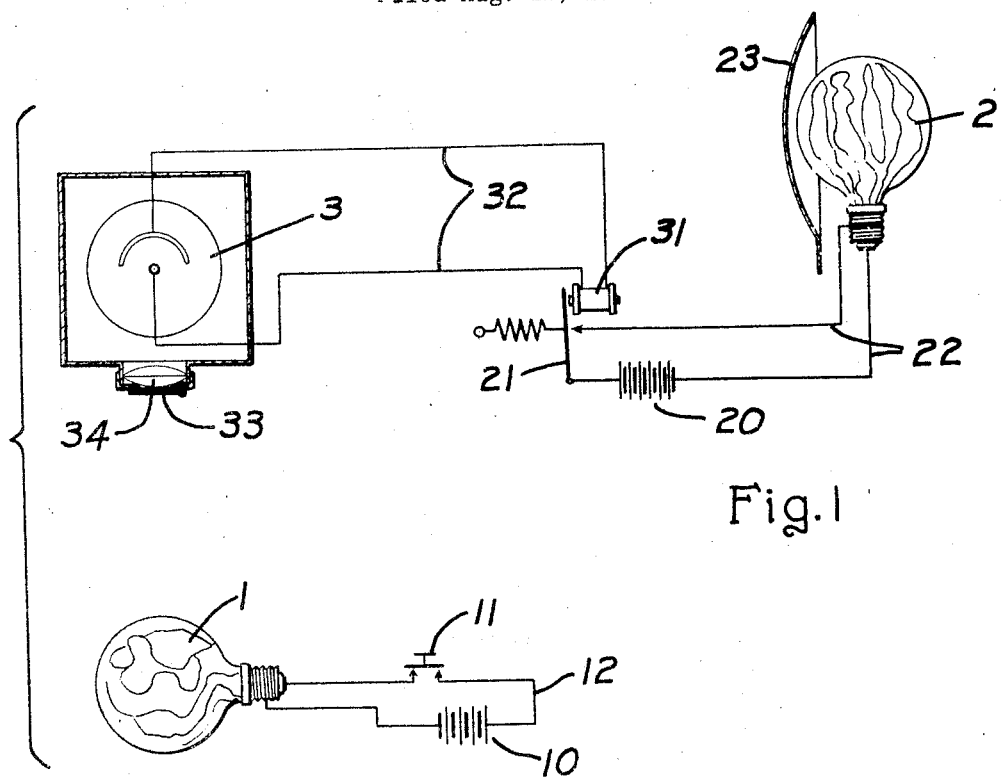
Figure 1 is a diagram of a master unit and one of several slave units, and illustrates the cooperative relationship between them.

The master unit may be substantially unchanged from present-day practice, and is diagrammatically shown in Figure 1 as a flash-bulb 1 provided with means to energize it and to cause its illumination, such means consisting, in the embodiment shown, of the battery 10, usually a dry cell battery, and a push button switch 11, both of them being included in the circuit 12 which also includes the flash-bulb 1. The whole is usually assembled in the well-known form, resembling an electric torch, and usually a reflector is employed in association with the flash-bulb 1 to concentrate and to direct its light.

The slave unit (representative of any required number of like independent units), likewise incorporated as part of Figure 1, in similar fashion incorporates a flash-bulb 2. A local source of current, such, for intsance, as the battery 20, is in the circuit 22 with the flash-bulb 2, and the flash-bulb is energized on closure of the circuit through a normally open switch 21. This switch is arranged for operation—that is, for closure—by a means which is sensitive to radiation emanating from a transmitter which is incorporated in or which is associated with the master unit.

In the form shown in Figure 1, which represents the most preferred form, the flash-bulb 1 itself may be considered as the transmitter. This generates and radiates waves of light when the flash-bulb 1 is energized, and these light waves, passing with the speed of light through space, reach and energize a photo-sensitive device 3, which may be considered as a receiver in each slave unit which is responsive to the radiation emanating from the transmitter 1. A common example of such a photo-sensitive device, as shown, is a photo-electric cell, but any other type of light-sensitive operating mechanism is intended to be included within term photo-sensitive device or photo-electric cell as used herein. The photo-electric cell, upon being thus energized, generates an electric current in a circuit indicated at 32, and which circuit includes a relay 31 so disposed as to attract and close the switch 21.

As will now be apparent, upon pressure on the push button 11 the master light source is energized; the light which emanates from it is received by the photo-electric cell 3, which is so disposed and directed as to receive this light, though distant from the light source 1, and which is closely associated with the flash-bulb 2. The current thus generated, though minute, is caused, through the relay 31 and switch 21, to energize and set off the enslaved flash-bulb 2.

It scarcely needs to be pointed out that the single master light source 1 will effect operation of as many slave units as are set up within its influence, or, if desired, a relay effect may be obtained, one master flash-bulb setting off one or more slave bulbs 2, which in turn, and acting as master sources, set off additional slave units. The latter arrangement might be very desirable in a case where side lighting, by units around a corner from the initial master bulb, is required, or in a case where the most distant slave unit is so far removed from the initial master light source that the latter may fail to produce sufficient response in the photo-sensitive device 3. Each such unit is entirely self-contained and compact, and may readily be distributed about an auditorium, no external wires nor connections of any sort being required for the master unit nor for any slave unit.

It should be understood that certain slave units may be connected to the master unit, for operation, through wire connections, by the master key 11. The use of wires running to some slave units from the master unit may, in some circumstances, be unobjectionable, and yet more inaccessible points may require illumination that can be afforded by wire-connected slave units only with difficulty, and in such instances an independent slave unit or units, according to my invention, may be employed at such points, in conjunction with the known wired system. In such a case it is immaterial which be considered the master unit, that in the hand of the operator, and incorporating the master key, or one of the wire-connected slave units, for the result is the same—the unconnected slave unit is energized by light originated through the pressing of the master key.

It may be considered that there is some lag in the system, some difference of time between energization of the flash-bulb 1 and the flash-bulb 2. Theoretically this is true, but in practice the time difference is so minute that it cannot be measured. It can only result from two sources; the passage of light through space, or the passage of electricity through its conductors, as the one factor, and the inertia or lag of the photo-electric cell operated switch, as the second factor. The second factor indeed produces a far greater time delay than the first factor, yet the time delay is so minute that to all intents and purposes the two flash-bulbs are illuminated at precisely the same instant. In any event they are so nearly simultaneously illuminated that the effect upon the exposed plate is the same as if there were no lag whatsoever.

Provision may be made for reducing or otherwise governing the amount of light permitted to affect the photo-electric cell 3. Such photographs may be taken in a hall which by normal standards is brilliantly illuminated, yet insufficiently illuminated for photographic purposes. At the same time the degree of illumination may be so great that it is desired to prevent any possibility of energization of the photo-electric cell 3, and therefore the degree of normal illumination which may affect the cell 3 is cut down by the provision of a shutter indicated at 33. Likewise a lens 34 may be provided, to concentrate the received light and to cause it more surely to affect the cell 3. In the same manner as the light of the flash-bulb 1 is concentrated and directed, a reflector 23 may be provided for concentrating and directing the light from the flashbulb 2.

Figure 2:
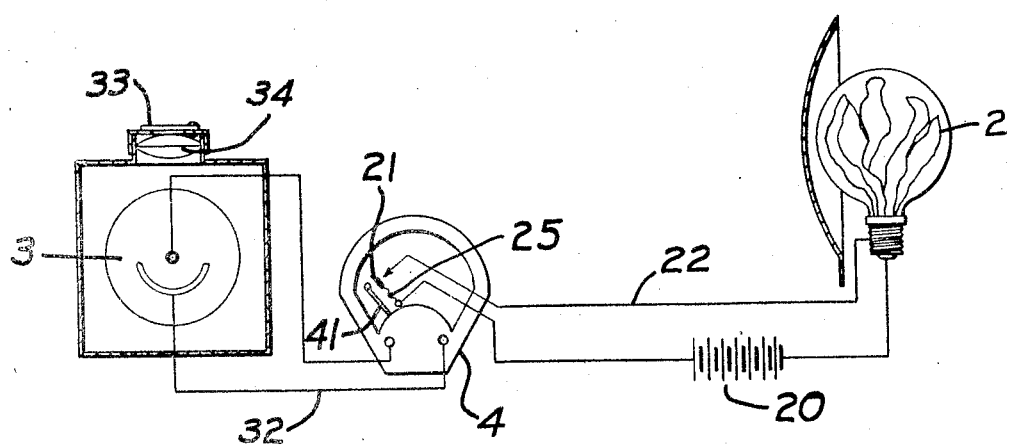
Figure 2 is a similar diagram of a slightly modified form of slave unit, for use with a similar master unit.

The only part of such system which is not readily available commercially is the relay 31. Such relays can, of course, be built, but it may be at times difficult to obtain a relay sufficiently sensitive for the purpose. However, it is readily possible to obtain a microammeter, and such a device may be substituted for the relay 31, as in the circuit shown in Figure 2, which illustrates only the slave unit. Here the switch 21 is carried upon a light spring 25, disposed in such position that the needle or finger 41 of a microammeter 4, upon moving across the dial, upon its energization, will strike the switch arm 21 and move it into contact with the corresponding switch point in the circuit 22 of the flash bulb 2. When the light from the master source 1 is received by the photo-electric cell 3, the minute current thus generated causes movement of the indicating finger 41 of the microammeter and thereby closes the switch 21 and effects energization of the secondary or enslaved light source 2.

The master flash-bulb 1 may be considered, in the larger sense, as a source of radiation in wave form, and the photo-electric cell 3 as a receiver of radiations in wave form which is attuned to the transmitter 1, or is responsive to the light therefrom. Since light is but one form of wave energy other forms of radiant energy may likewise be employed, and in Figure 3 has been shown a system (not necessarily intended as the preferred form, but solely as illustrative) consisting of a master unit and a slave unit in which transmitter is a spark gap or radio transmitter, and the receiver includes a radio receiving circuit tuned to (that is, responsive to) the transmitter. Also, in Figure 3 the master unit has a transmitter which is separate from and in no wise dependent upon the light source 1. Indeed, it is not at all essential that there be a light source at the master control, except where the system is one that operates by a master light source acting also, in a dual capacity, as a transmitter of light energy to photo-sensitive devices.

In Figure 3 the master light source 1 is shown in a circuit 12 which includes the key 11' and the current source 10, but a separate circuit 50, including the alternator 5 and the switch 51 connected for movement with switch 11', alone contains the transmitter of energy. The transmitter circuit, generally indicated by the numeral 52, includes the spark gap 50 or other source of oscillations, and the antenna 53. It may be considered that, upon closure of the switch 51, 11', not only is the master light source 1 energized, if such a light source be employed, but also a signal is transmitted from the antenna 53.

The signal thus transmitted is received by the antenna 35, and the circuit 36 is energized; this circuit includes the relay 31. The switch 21 is closed by energization of the relay 31, and in the same manner as before the circuit 22 that includes the slave light source 2 is energized, and the flash-bulb 2 is set off simultaneously with the light source 1.

It has been pointed out above that there need not be a master light source 1. Primarily at the master or control station there is a transmitter of energy in wave form, to be received by a receiver at a distant point, which receiver is associated with each slave unit, and the master light source is used primarily to supplement the illumination and to provide illumination adjacent the camera where the master control station is usually located, but if it is desired to effect the control from some other point, as for instance the floor of an auditorium, it is not at all essential that a light source be employed in conjunction with the master control station.

Also, while flash-bulbs are the most convenient form of intense illumination for such purposes, it is not outside the scope of my invention to provide illumination by other means, and to effect energization of such other types of light source in the same way—that is, by transmission of radiations from a master station to a controlled station, thereby to effect energization of the controlled or slave light source. For instance, the light sources may be physically independent spot lights or the like, which are energized, all simultaneously, by a master control, through transmission of radiations.

It is believed that the principles of my invention will be clear from the above, and it will likewise be clear that the disclosure is purely for purposes of illustrating the nature of my invention, and without any intention of restricting it to the forms and arrangements shown, and it has been pointed out above wherein the forms of the individual elements, and their relative arrangements, may be changed.

The invention has been described as employed in effecting simultaneous illumination from various points. It is sometimes desirable, for news photographs for instance, to take a variety of pictures of the same scene from different angles, and the same principles may be employed for operating several cameras, differently located, simultaneously, so that at the same instant, for instance at the climax of a ceremony, photographs of the scene may be taken from various points of vantage. One of the cameras may contain a master key or a master key may be associated with its shutter, and slave units may be associated with the shutters of the other cameras, such as by operating a Mendelsohn magnetic synchronizer, which is customarily used in press work to actuate the shutter at the same time a flash bulb is energized. These several slave units will be energized by the action of operating the shutter of the master camera, and all the plates will be exposed simultaneously. For such purposes, while artificial illumination may be required, in order to avoid the possibility of undue light intensity in front of the lens of any one of the cameras, the radio transmission as set forth in connection with Figure 3 may be found the preferable means of transmitting the action from one camera to the other.

What I claim as my invention is:

1. A system for photographing large audiences and other scenes by artificial light, said system comprising a master unit including a wave transmitter and control means operable at will to effect energization of said wave transmitter, and at least one slave unit including a light source of the flash type disposed to illuminate the scene and control means therefor physically uninterconnected with the control means of the master unit, said slave unit control means incorporating a receiver responsive to radiations from the master unit wave transmitter to be energized by the transmitter's wave and operable when energized to effect energization of said flash light source for instantaneous illumination of the scene.

2. A system for photographing by artificial light large audiences and other scenes which are of a size or depth such that a single light source is inadequate, said system comprising a plurality of compact units distributed about the scene, each said unit including a light source for local illumination of the scene when energized and control means therefor physically uninterconnected with the control means of other such units, each said control means incorporating a radiation energizable element operable when energized to effect energization of its related light source, a source of radiations to which the radiation energizable elements of all said units are responsive, and means to energize said radiation source at will thereby to energize all said unit elements and their respective related light sources for simultaneous illumination of the scene.

3. The system as defined in claim 2, including a light source associated with and energizable by the means which energizes the radiation source, to effect illumination of the scene also by the light source associated with such radiation source substantially simultaneously with illumination thereof by the unit light sources.

4. A system for photographing large audiences and other scenes by artificial light, said system comprising a master unit including a light source and control means operable at will to effect energization of said light source, and a compact slave unit remote from said master unit including a light source disposed to illuminate the scene and control means therefor physically uninterconnected with the control means of the master unit, said slave unit control means incorporating a photo-sensitive device disposed to receive light from the remote master unit light source and operable when energized to effect energization of said slave unit light source for illumination of the scene.

5. A system for photographing large audiences and other scenes by artificial light, said system comprising a master unit including a light source and control means operable at will to effect energization of said light source, and a plurality of slave units distributed about the scene, each slave unit including a light source and control means therefor physically uninterconnected with the control means of the other slave units, each slave unit control means incorporating a photo-sensitive device disposed to receive light from the master unit light source and operable when energized to effect energization of its related light source, for illumination of the scene simultaneously by all said slave unit light sources.

6. A system for photographing large audiences and other scenes by artificial light, said system comprising a master unit including a light source and control means operable at will to effect energization of said light source, and a plurality of slave units distributed about the scene, each slave unit including a light source and control means therefor physically uninterconnected with the control means of the master and other slave units, each slave unit control means incorporating a photo-sensitive device disposed to receive light from the master unit light source and operable when energized to effect energization of its related light source, for illumination of the scene simultaneously by all said slave unit light sources.

7. The system as defined in claim 6, including means associated with each photo-sensitive device adjustable to determine the light intensity received thereby from the master unit light source.

8. A system for photographing large audiences and other scenes by artificial light, said system comprising a master unit including a light source and control means operable at will to effect energization of said light source, and at least one slave unit including a light source of the flash type disposed to illuminate the scene and control means therefor physically uninterconnected with the control means of the master unit, said slave unit control means incorporating a photo-sensitive device disposed to receive light from the master unit light source and operable when energized to effect energization of said slave unit flash light source for instantaneous illumination of the scene substantially simultaneously with illumination thereof by said master unit light source.

9. A system for photographing large audiences and other scenes by artificial light, said system comprising a master unit including a light source of the flash type and control means operable at will to effect energization of said light source, and at least one slave unit including a light source disposed to illuminate the scene and control means therefor physically uninterconnected with the control means of the master unit, said slave unit control means incorporating a photo-sensitive device disposed to receive light from the master unit flash light source and operable when energized to effect energization of said slave unit light source for illumination of the scene substantially simultaneously with illumination thereof by said master unit light source.

10. A system for photographing large audiences and other scenes by artificial light, said system comprising a master unit including a light source of the flash type and control means operable at will to effect energization of said light source, and at least one slave unit including a light source of the flash type disposed to illuminate the scene and control means therefor physically uninterconnected with the control means of the master unit, said slave unit control means incorporating a photo-sensitive device disposed to receive light from the master unit flash light source and operable when energized to effect energization of said slave unit flash light source for instantaneous illumination of the scene substantially simultaneously with illumination thereof by said master unit flash light source.

11. A system for photographing large audiences and other scenes by artificial light, said system comprising a master unit including a light source and control means operable at will to effect energization of said light source, and a plurality of slave units intended for distribution about the scene, each slave unit including a light source, a power supply, and control means physically uninterconnected with the control means of the other slave units and operable to interconnect its related light source and power supply, each slave unit control means incorporating a photo-sensitive device arranged to receive light from the master unit light source, switch actuating means in circuit with the photo-sensitive device, and switch means in circuit with its related power supply and light source closed by said switch actuating means when said photo-sensitive device is energized to effect energization of the light source associated with said switch means for illumination of the scene.

12. A system for photographing large audiences and other scenes by artificial light, said system comprising a master unit including a light source and control means operable at will to effect energization of said light source, and at least one slave unit including a light source disposed to illuminate the scene, a power supply and control means physically uninterconnected with the control means of the master unit and operable to interconnect its related light source and power supply, said slave unit control means incorporating a photo-sensitive device arranged to receive light from the master unit light source, a relay member moved by energization of said photo-sensitive device, and switch means in circuit with said power supply and slave unit light source adapted to be closed by movement of said relay member to effect energization of said slave unit light source for illumination of the scene.

13. The method of illuminating large audiences and like scenes instantaneously by artificial light for photographing them, which comprises preliminarily locating a radiation source, preliminarily distributing about the scene, each in a location to illuminate a desired portion thereof, a plurality of light sources controllable by radiation from such radiation source, and at will transmitting radiation from the radiation source and thereby effecting simultaneous illumination of the scene by the several light sources.

14. The method of illuminating large audiences and like scenes instantaneously by artificial light for photographing them, which comprises preliminarily locating a master light source for illuminating one portion of the scene, preliminarily locating a slave light source, controllable by light from the master light source, in position for receiving light from the master light source and for illuminating another portion of the scene, and at will illuminating the master light source and thereby energizing the slave light source for simultaneous instantaneous illumination of the scene by both light sources.

BENJAMIN H. WILDMAN.